Figure 1:
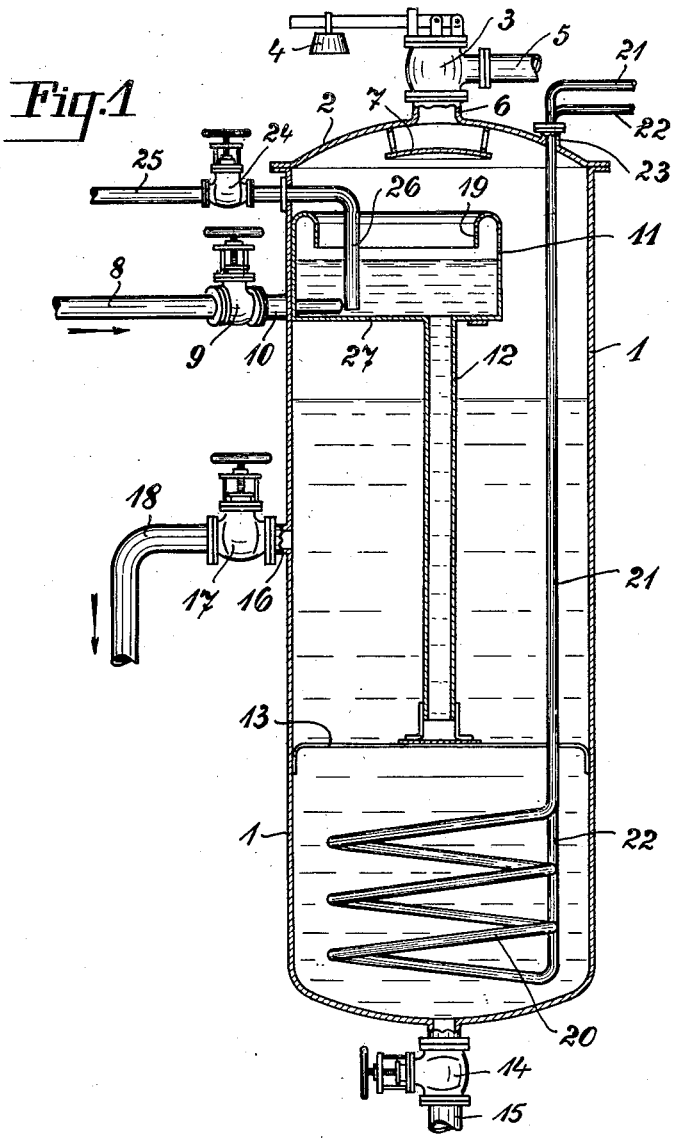

Aug. 28, 1934.  H. KOPPERS  1,971,964
METHOD OF RECOVERING AMMONIUM SULPHATE AND SULPHUR FROM GASES
CONTAINING AMMONIA AND SULPHURETTED HYDROGEN
Filed March 16, 1931

Inventor:
Heinrich Koppers
By Henry Love Clarke
His Attorney

Patented Aug. 28, 1934

1,971,964

UNITED STATES PATENT OFFICE 1,971,964

METHOD OF RECOVERING AMMONIUM SULPHATE AND SULPHUR FROM GASES CONTAINING AMMONIA AND SULPHURETTED HYDROGEN

Heinrich Koppers, Essen-on-the-Ruhr, Germany, assignor, by mesne assignments, to The Koppers Company of Delaware, Pittsburgh, Pa., a corporation of Delaware Application March 16, 1931, Serial No. 523,105
In Germany November 1, 1929

2 Claims. (Cl. 23—225)

My invention relates to a method of removing ammonia and sulphuretted hydrogen from gases, particularly coal distillation gases, for the purpose of recovering ammonium sulphate and sulphur, as well as to an apparatus for carrying out this process, in which the gases are brought into contact with solutions of thionates of ammonium, iron, manganese or zinc, which take up ammonia and sulphuretted hydrogen forming ammonium thio-sulphate, which compound after complete or partial conversion by means of sulphurous acid into ammonium polythionate may be converted into ammonium sulphate and sulphur by heating under pressure at a temperature above 130 deg.

In this final stage, there is generally produced a 50% ammonium sulphate lye, whilst the sulphur accumulates in liquid form on the bottom of the autoclave.

The removal of these two substances from the autoclave whilst at the same time releasing the pressure, gives rise to considerable difficulties, particularly with regard to a satisfactory separation of the two components, which is so important if pure products are to be obtained.

Whilst the expansion of the sulphate lye, as the water evaporates and the lye is correspondingly cooled, may easily be carried out, the liquid sulphur accumulating under the lye does not at first participate in the cooling and thus brings about a formation of vapor in the lye, which like the actions well known from distillation processes, results in a mixture of the sulphate lye with the liquid sulphur. It is true that this difficulty may be obviated by the sulphur being first removed by a bottom valve or an immersion pipe, but even then complete separation cannot be produced and the sulphate lye cannot be prevented from going over.

The present invention relates to a process whereby the above difficulties may be avoided in the carrying out of the final stage of the thionate process in which the ammonium polythionate is decomposed into ammonium sulphate and sulphur. The method according to the invention consists in this, that the contents of the high pressure autoclave are emptied into a suitably proportioned intermediate vessel whilst the pressure is partially released, but the pressure in this intermediate container is only reduced so far that the sulphur still remains fluid, which is the case at a pressure of 2 atm. From the intermediate vessel the ammonium sulphate lye is drawn off on the one side and the liquid sulphur on the other side, either continuously or intermittently, but at the same time the intermediate vessel is not completely emptied.

A further object of the invention is a vessel or container for carrying out the new process, this vessel having in the top an adjustable relief valve, which serves for the regulation or keeping constant of the pressure in the vessel, and which is equipped with a pipe-coil for heating or cooling the liquid, and a top discharge cock for the sulphate lye as well as a bottom valve for letting out the liquid sulphur. Finally the invention includes the arranging of an inner vessel which serves for extracting vapor and steadying the liquid admitted into the vessel from the high pressure autoclave, and in which the fluid introduced is released in pressure whilst vapor is more or less developed, but during this release of pressure the lye contained in the vessel and the liquid sulphur accumulating underneath are not whirled up. From this inner vessel, the fluid released in pressure is led off together with the melted sulphur through a pipe approximately up to the surface of the liquid sulphur accumulating on the bottom of the vessel.

In the drawing, Fig. 1 shows a vertical longitudinal section of the vessel forming the object of the invention.

Figure 2:
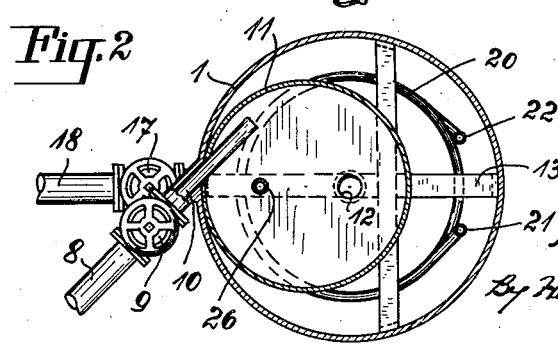

Fig. 2 is a section on line a—a of Fig. 1.

The pressure releasing or expansion vessel shown in the drawing consists of a pressure-tight, preferably cylindrical container 1 of steel or other suitable material, closed at the bottom whilst the top opening may be closed by a cover 2 which carries a customary relief valve 3 with an adjustable balance weight 4. The escaping steam is led off from the escape valve through the pipe 5. In order that no spurts of liquid may pass into the relief valve, there is provided underneath the branch 6 supporting the valve, a baffle plate 7 which is attached to the top of the vessel at such a distance that the escaping steam may flow off through the space between the edge of the plate and the cover of the vessel.

The liquid coming from the high pressure autoclave through the pipe 8 is introduced by a pipe branch 10 controlled by a valve 9 and entering almost tangentially into a cylindrical evaporation box 11 arranged in the upper portion of the pressure relieving vessel. The evaporation box is open at the top, so that the steam produced during the expansion in the evaporation box can escape into the upper space of the vessel 1.

Due to the tangential arrangement of the branch 10, the fluid assumes a rotary movement when flowing into the evaporation box. In order to prevent the fluid being hurled out of the box the upper edge of the latter is bent inwardly in approximately U-shaped section, so that the liquid can rise up in the hollow at the edge.

From the evaporation box, the devaporized fluid is drawn off into the bottom portion of the vessel through a pipe 12 whose bottom end is supported by a cross member 13 from the vessel wall. Upon emerging from the pipe 12, the two components of the liquid, that is the ammonium sulphate lye and the liquid sulphur, separate. The latter collects on the bottom of the vessel 1, from whence it can be discharged into the usual sulphur solidification tank through a discharge pipe 15 controlled by a valve 14. The clear ammonium sulphate lye is removed from the vessel through a pipe 16—preferably arranged somewhat above the middle of the vessel—into a sulphate discharge pipe 18 controlled by a valve 17, and is preferably delivered to an evaporation or drying apparatus in which the salt lye is confined until it crystalizes.

In order that in the vessel the temperature in the liquid sulphur and the ammonium sulphate lye may be kept at the desired degree, the vessel is also furnished with a spiral heating coil 20, which is accordingly supplied with a heating or cooling medium through the pipe 21. Moreover the heating coil is also supplied with a pipe 22 serving to lead off the heated cooling fluid, or the water of condensation. The two pipes 21 and 22 are preferably led into the interior of the vessel by branches 23 provided in the cover of the vessel.

In the top portion of the expansion vessel 1 there also enters a pipe 25 controlled by a valve 24 and whose inner end 26 is bent downwards and terminates inside the evaporation box 11 slightly above the bottom of same. Through the pipe 25, 26 concentrated ammonia water may be passed either continuously or intermittently into the expansion vessel, preferably in such quantities that the liquid coming from the high pressure autoclaves and containing more or less free sulphuric acid, is neutralized or made alkaline. Due to this neutralization of the acid liquor of the autoclave, it is possible to make the expansion vessel and fittings of ordinary sheet iron or steel, as neutral or alkaline liquids in the concentration they occur here, do not attack iron.

The method according to the invention or the use of the device for carrying out same, enables the duration of the charges of the high pressure autoclave to be considerably reduced, as the fluid inside the high pressure autoclave need not be reduced in pressure slowly, but may be passed over into the expansion vessel immediately after the reaction. Hence it is possible to operate with a less number of high pressure autoclaves than before, so that the installation and working costs for the plant for carrying out the above mentioned gas cleaning processes are appreciably reduced. The provision of an expansion vessel does not substantially increase the cost of the entire plant, as it may be made of cheap sheet iron, because inside it the liquid is made neutral or even alkaline by the addition of ammonia, so that the iron cannot be attacked, whereas it is imperative to make high pressure autoclaves of varieties of steel which are proof against the sulphuric acid released during the decomposition under pressure of the polythionates. Furthermore, the method according to the invention and the apparatus used for carrying out same permit the perfect separation of the sulphate and sulphur and hence the recovery of products, which as compared with those from former processes, are more valuable because they are considerably purer.

I claim:

1. In a method of recovering ammonium sulphate and sulphur from gases containing ammonia and sulphuretted hydrogen involving the use of thionate solutions, which are brought into contact with the gases, forming ammonium thiosulphate from polythionates, and which are thereafter converted under pressure and heat in a pressure vessel into ammonium sulphate and sulphur, the improvement comprising: passing the final reaction mixture of ammonium sulphate lye and liquid sulphur from the pressure vessel into an intermediate vessel while maintaining the pressure in the pressure vessel and at the same time releasing the pressure in the intermediate vessel and keeping the liquid in the intermediate vessel at a temperature above the melting point of sulphur whereby the sulphur is completely separated from the ammonium sulphate in the intermediate vessel, and thereafter drawing off these two substances separately from the intermediate vessel.

2. In a method of recovering ammonium sulphate and sulphur from gases containing ammonia and sulphuretted hydrogen involving the use of thionate solutions, which are brought into contact with the gases, forming ammonium thiosulphate from polythionates, and which are thereafter converted under pressure and heat in a pressure vessel into ammonium sulphate and sulphur, the improvement comprising: passing the final reaction mixture of ammonium sulphate lye and liquid sulphur from the pressure vessel into an intermediate vessel while maintaining the pressure in the pressure vessel and at the same time releasing the pressure in the intermediate vessel and keeping the liquid in the intermediate vessel at a temperature above the melting point of sulphur whereby the sulphur is completely separated from the ammonium sulphate in the intermediate vessel, adding ammonia water in the intermediate vessel until an alkaline reaction is produced from free acid in the sulphate lye introduced therein as aforesaid, and thereafter drawing off the ammonium sulphate and sulphur separately from the intermediate vessel.

HEINRICH KOPPERS.